March 24, 1931.    H. PELS    1,798,106
SHEARS FOR CUTTING PROFILED MATERIAL
Filed Jan. 31, 1929

Inventor
Henry Pels
By James L. Norris.
Attorney

Patented Mar. 24, 1931

1,798,106

UNITED STATES PATENT OFFICE

HENRY PELS, OF BERLIN-CHARLOTTENBURG, GERMANY

SHEARS FOR CUTTING PROFILED MATERIAL

Application filed January 31, 1929, Serial No. 336,447, and in Germany October 13, 1928.

This invention relates to shears for cutting rod-shaped material of any profile, especially iron, steel and other metals.

The chief object of the invention is to provide shears of the character just referred to with blades having cutting edges which will cut material more rapidly and efficiently than has heretofore been possible and produce smooth faces on the severed ends of the material.

In the past where it was desired that smooth faces should be formed on the line of cut, it has been customary to saw the material. This manner of cutting the material into short pieces is expensive and therefore uneconomical, as the sawing requires comparatively much time.

The use of shears for cutting profiled material has hitherto been limited because it has not been possible, with cutting blades moving past one another, to form clean cut faces on the line of cut. Scales are usually formed on the cut faces and the formation of such scales is greater in the inverse proportion to the resistance of the material to the cutting.

These scales, which hang to the material and lie thickly on the cutting face as flaps, present the serious inconvenience that they do not combine with the main mass of the material when the material is subsequently subjected to heat treatment. Such blanks thereby become waste.

These inconveniences are avoided according to the invention by a special construction of the cutting blades of the shears. The invention is characterized by such a conformation of the cutting edges of the cutting blades, that the mutual distance beween the cutting edges parallel to the longitudinal axis of the blank is varied at all points of the length of the cutting edges in proportion to the thicknesses of the cross section of the blank at such points and is, at the points where the material offers greater resistance smaller than at points where the material offers less resistance.

The following figures of drawings illustrate the invention:

In all figures $a$ designates the blank to be cut, $b$ designates the upper blade, $c$ the lower blade; $k$ is the cutting edge of the upper blade $b$, and $k_1$ the cutting edge of the lower blade $c$.

Figure 1:
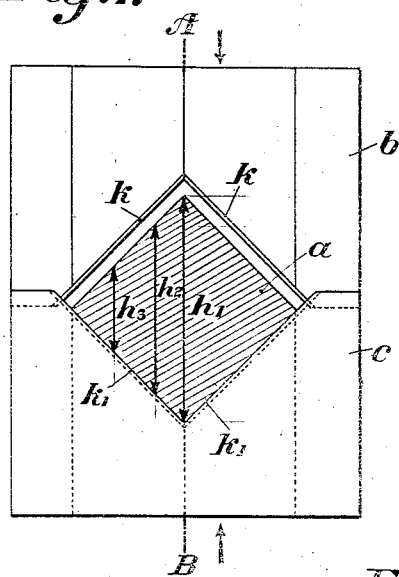
Fig. 1 shows the cutting blades with the blank between the same in front elevation prior to the cutting.
Figure 2:
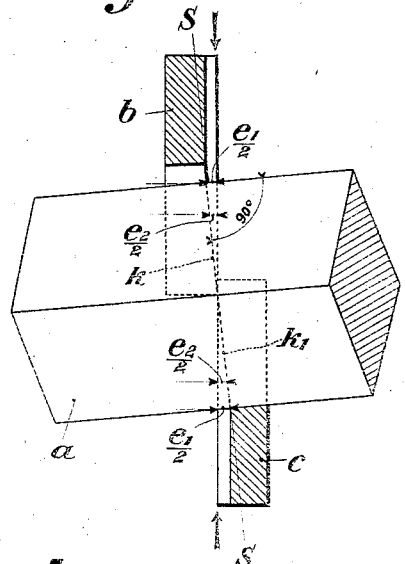
Fig. 2 is a vertical longitudinal section on line A—B of Fig. 1.

The knives or blades $b, c$ move towards each other and past one another in the direction of the arrow lines in Figs. 1 and 2. One of the two blades might however be stationary and the other blade might be movable. The line S—S in Figure 2 designates the plane on which the material is separated.

According to the invention the distance between the cutting edges $k, k'$ of the blades $b$, $c$ at a right angle to their direction of movement is at all points of the cutting edges $k, k'$ proportional to the thickness at these points of the cross section of the blank $a$ and the greater the resistance of the blank the smaller the distance is between the cutting edges of the blades.

Figure 3:
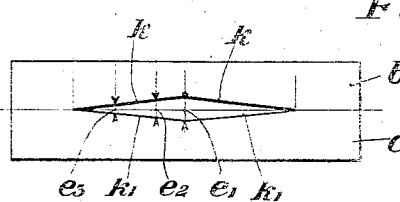
Fig. 3 is a top plan view of the cutting blades and shows the conformation of their cutting edges.

In Figure 1 parts of the cross section of the material of different thicknesses are indicated by the lines $h', h^2$ and $h^3$ and the distances between the cutting edges of the cutting blades $b$ and $c$ at corresponding points of the blades are indicated in Figure 3 as $e'$, $e^2$ and $e^3$.

According to the invention the cutting edges of the blades $b$ and $c$ are so ground or formed that the distances $e', e^2, e^3$ between them are proportionate to the cross section or thickness on the lines $h', h^2$, and $h^3$ of the material to be cut, and so that, the greater the thickness of the material is at a given point, the greater the corresponding distance between the cutting edges of the blades $b$ and $c$ will be. For example, in the case of a bar of square cross section the diagonal thickness $h'$ is the greatest so that the distance $e'$ between the blades $b$ and $c$ at the corresponding parts of said blades is also greatest. At the two side corners of the square cross-section of the blank $a$ the thickness is equal to zero, and the distance between the cutting edges $k$, $k'$ at the corresponding parts of their length must practically also be equal to zero. As the thickness of a bar of square cross-section decreases from the greatest thickness $h'$ towards each side along a diagonal line to zero, the distances $e$ between the cutting edges $k$, $k'$ decrease also from the maximum $e'$ towards both sides along straight lines to zero.

The distance between the cutting edges $k$ and $k'$ along their length varies not only according to the variation in thickness of the material to be cut but also according to the resistance of the material to the cutting. The softer the material is, the greater must be the distance between the cutting edges $k$ and $k'$.

A cut not only specially clean and smooth but also accurately straight, i. e. perpendicular to the longitudinal axis of the blank, is obtained, when the blank $a$ is inserted between the blades at a slight inclination (Fig. 2).

It is evident, that with shears having cutting blades according to the invention blanks of a profile composed in any desired manner of straight and curved lines can be cut smooth and straight, rapidly and economically.

I claim.

Shears for cutting profiled blanks, comprising cutting blades movable past one another and of which the distance between the cutting edges in a plane transverse to the blades is greatest at the point of maximum thickness of the material to be cut and decreases towards the points of minimum thickness of such material proportionately to the decrease of such thickness.

In testimony whereof I have hereunto set my hand.

HENRY PELS.